United States Patent
Jürgensen

(10) Patent No.: US 6,434,177 B1
(45) Date of Patent: Aug. 13, 2002

(54) SOLID LASER WITH ONE OR SEVERAL PUMP LIGHT SOURCES

(75) Inventor: Heinrich Jürgensen, Raisdorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/445,068
(22) PCT Filed: May 27, 1998
(86) PCT No.: PCT/DE98/01448
§ 371 (c)(1), (2), (4) Date: Feb. 17, 2000
(87) PCT Pub. No.: WO98/56086
PCT Pub. Date: Dec. 10, 1998

(30) Foreign Application Priority Data

Jun. 3, 1997 (DE) .......................................... 197 23 269

(51) Int. Cl.$^7$ ................................................ H01S 5/00
(52) U.S. Cl. .............................. 372/43; 372/92; 372/96; 372/69; 372/101
(58) Field of Search .............................. 372/43, 92, 69, 372/101, 99

(56) References Cited

U.S. PATENT DOCUMENTS

| | | | |
|---|---|---|---|
| 4,383,318 A | 5/1983 | Barry et al. | |
| 4,723,257 A | 2/1988 | Baer et al. | |
| 5,022,043 A | 6/1991 | Jacobs | |
| RE33,722 E | 10/1991 | Scifres et al. | |
| 5,268,978 A | 12/1993 | Po et al. | |
| 5,418,880 A | 5/1995 | Lewis et al. | |
| 5,436,990 A | 7/1995 | Head et al. | |
| 5,546,487 A | 8/1996 | Fantone | |
| 5,608,742 A | 3/1997 | Petersen | |
| 5,663,979 A | * 9/1997 | Marshall | 372/103 |
| 5,999,554 A | * 12/1999 | Marshall | 372/71 |

FOREIGN PATENT DOCUMENTS

| | | |
|---|---|---|
| DE | 44 15 269 | 11/1995 |
| DE | 39 43 722 | 1/1996 |
| DE | 44 38 368 | 5/1996 |
| DE | 196 01 991 | 8/1996 |
| DE | 196 03 704 | 8/1996 |
| EP | 0 723 323 | 7/1996 |
| FR | 2 741 726 | 5/1997 |
| GB | 2 239 733 | 7/1991 |
| JP | 06268299 | 9/1994 |
| WO | WO 90/16099 | 12/1990 |

OTHER PUBLICATIONS

Applied Physics B—2318b Lasers and Optics Dec. (1994) No. 6, Berlin–Kushawaha et al.
High–Intensity Rectangular Fiber–Coupled Diode Laser Array For Solid–State Laser Pumping—Morris et al—Applied Optics, vol. 32, No. 27, Sep 20, 1993.

* cited by examiner

Primary Examiner—Paul Ip
Assistant Examiner—Delma R. Flores Ruiz
(74) Attorney, Agent, or Firm—Schiff Hardin & Waite

(57) ABSTRACT

In a solid laser with one or several pump light sources whose radiation is fed into a laser crystal with a high light density, a laser crystal and an optical resonator are provided. Each pump light source is formed of several laser diodes. The light from the laser diodes of each pump light source is in-coupled by means of a single optical waveguide.

30 Claims, 5 Drawing Sheets

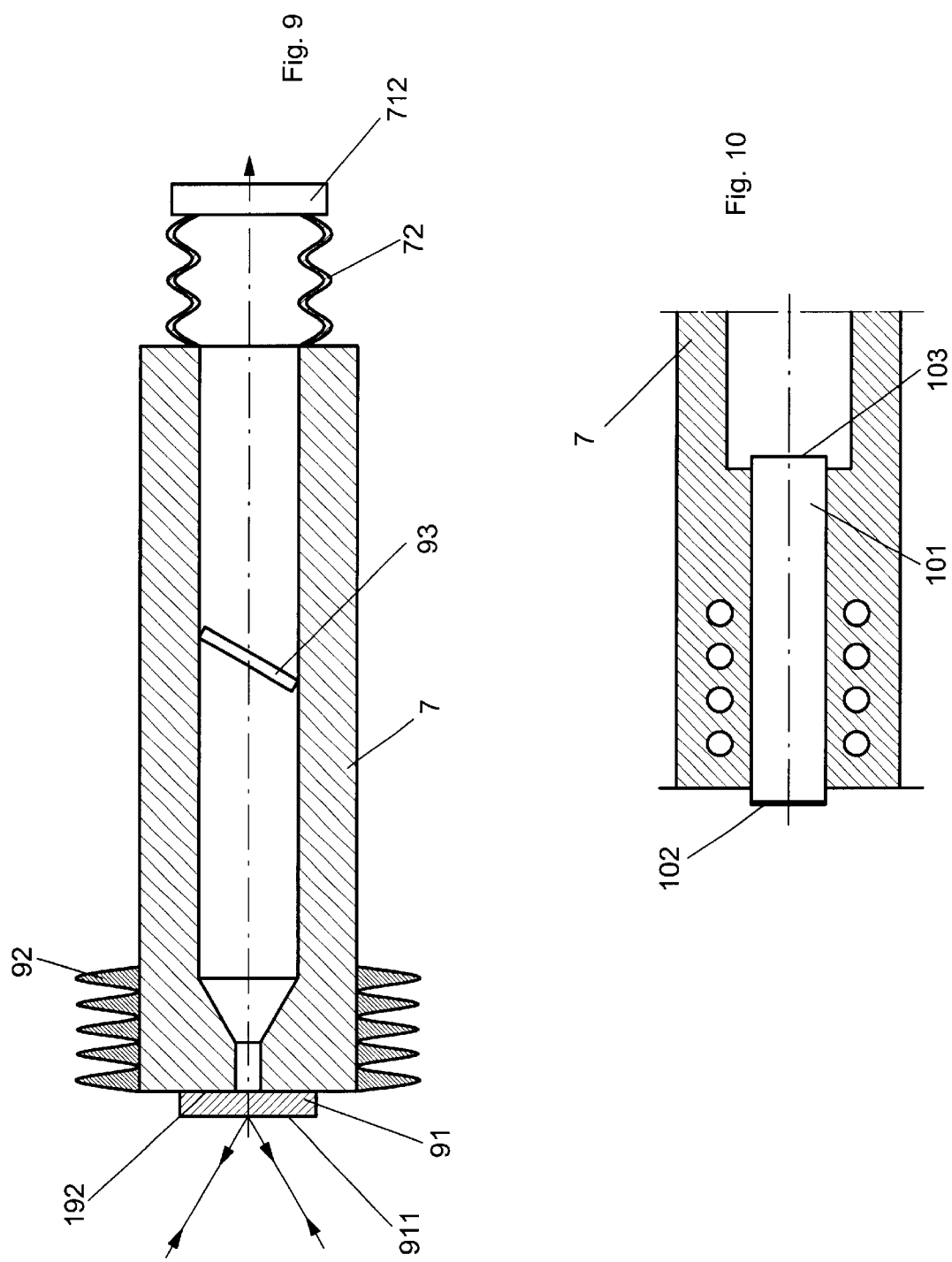

SOLID LASER WITH ONE OR SEVERAL PUMP LIGHT SOURCES

BACKGROUND OF THE INVENTION

The invention is directed to a pump fiber with high luminous density for solid-state lasers with one or more pump light sources.

U.S. Pat. No. 5,127,068 discloses an arrangement for coupling a multi-emitter laser diode to a multi-mode optical fiber, whereby each emitter emits the pump light onto the laser crystal via an optical fiber. What is thereby disadvantageous is that only a low luminous density on the laser crystal is achieved as a consequence of the large fiber bundle diameter and, thus, the efficiency of the laser arrangement remains low. Another disadvantage of this arrangement is the involved and complicated coupling of the individual optical fibers to the emitters. Moreover, the power density is relatively low, since the fibers cannot be packed densely enough, and each fiber can only accept the power of one emitter. The power density lies approximately at 1 KW/cm".

EP 0 632 551 A1, FIGS. 28 and 29 plus corresponding description, disclose a laser amplifier system wherein a laser crystal is pumped with a multiple mirror arrangement via a fiber bundle. In addition to the above-described disadvantage of the fiber bundle, a multi-mirror arrangement is required in the pump beam path of the laser, this being involved and complicated to manufacture. Further, such an arrangement is difficult to manufacture with adequate cleanliness and is difficult to protect against contamination during operation. As a result thereof, a short service life derives, particularly given high powers.

SUMMARY OF THE INVENTION

An object of the invention is to manufacture a more cost-beneficial laser arrangement with high output power, high efficiency and long service life that is simple to fabricate.

According to the present invention, a solid-state laser is provided having at least one pump light source with a plurality of laser diodes. An optical laser resonator with a laser crystal is provided whereby laser light generated in the laser diodes is coupled into the laser crystal. For generating a high luminous density of the laser light coupled into the laser crystal, the laser diodes of each pump light source are followed by a multi-mirror arrangement with which the laser light of the individual laser diodes is superimposed. A single waveguide is provided into which the superimposed laser light with high luminous density is coupled and transported to the laser crystal. The single waveguide is arranged behind the multi-mirror arrangement of each pump light source.

BRIEF DESCRIPTION OF THE DRAWINGS

FIG. 2a is a cross-section through a fiber that is employed for the pump light;

FIG. 2b is a cross-section through another embodiment of a fiber for the pump light;

FIG. 9 is an embodiment of a laser resonator with tubular housing and a wafer-shaped, mirrored laser crystal; and FIG. 10 is an embodiment of a laser resonator having tubular housing and a rod-shaped, mirrored laser crystal;

DESCRIPTION OF THE PREFERRED EMBODIMENTS

Figure 1:
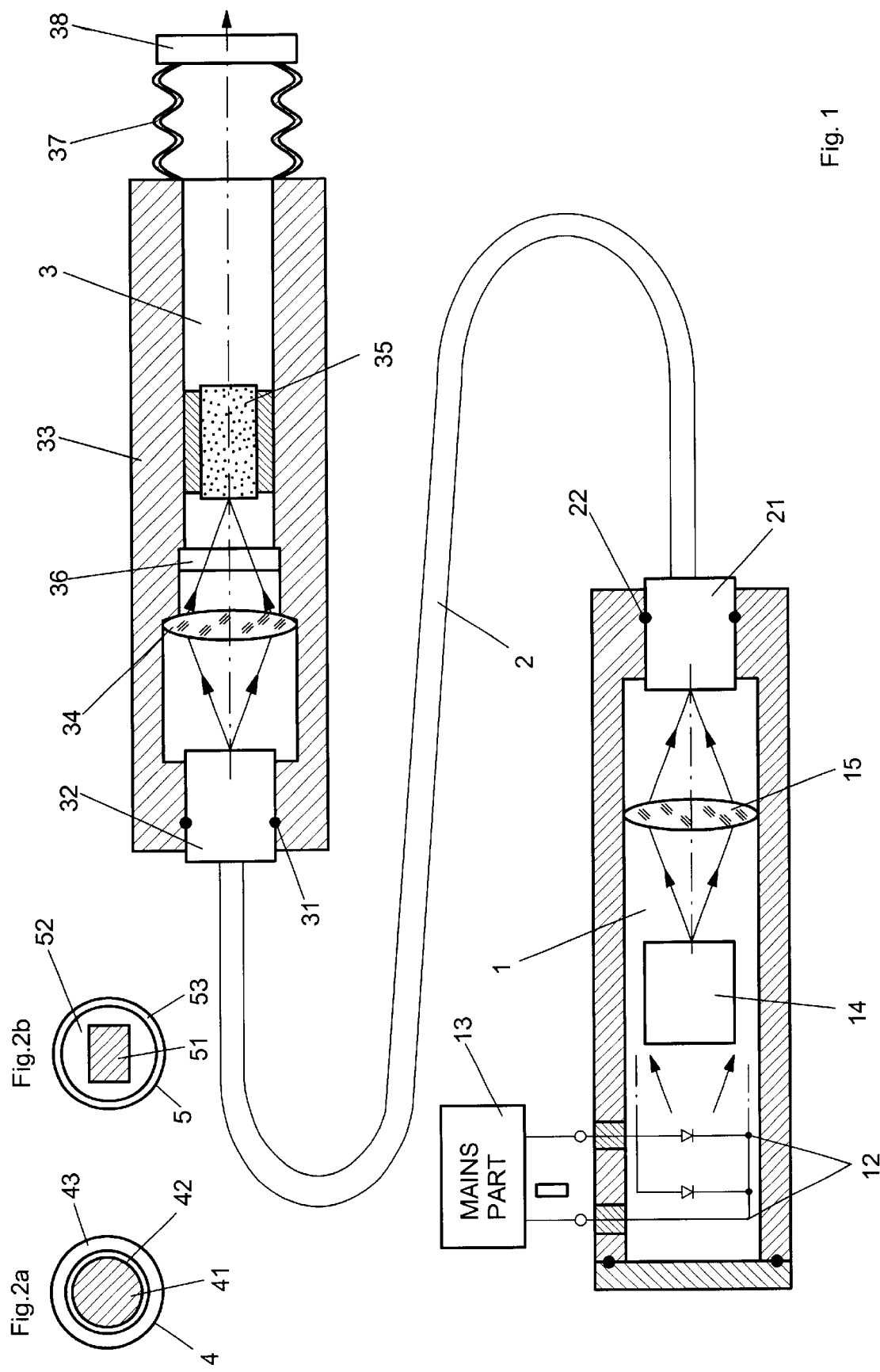
FIG. 1 is a sectional view of a solid-state laser that is pumped via an optical fiber by a pump source composed of an array of a plurality of laser diodes.

FIG. 1 shows an exemplary embodiment of the invention, whereby a laser diode unit 1, which serves as pump light source, a light waveguide 2 that is shown here as single fiber, is connected to a laser resonator 3. The laser diode unit 1 is accommodated in a hermetically tight housing 11, whereby the one end of the light waveguide 2 is connected to the laser diode unit 1 with a releasable plug connector 21 that comprises a seal 22. The other end of the light waveguide 2 is likewise connected to the laser resonator 3 via a releasable plug connection 31 that comprises a seal 32. The housing 11 can be advantageously evacuated or can be filled with a protective atmosphere. The laser diode unit 1 is composed of a laser diode array 12 that is fed by a mains part 13. The light emerging from the laser diodes is coupled into the light waveguide 2 with a stepped mirror arrangement 14 and an optics 15. Such a stepped mirror arrangement is disclosed, for example, in DE 44 38 368 and, among other things, has the advantage that it can be especially cost-beneficially manufactured and requires only slight adjustment outlay, as has been shown. For efficient infeed of the laser diode energy, the light waveguide 2 is designed as a single fiber with small diameter.

The laser resonator is preferably composed of a tubular housing 33 to whose one end the light waveguide 2 is connected. The light of the light waveguide 2 is guided onto a laser crystal 35 via an optics 34, whereby a first laser mirror 36 is located between the optics 34 and the laser crystal 35. A corrugated tube 37 placed at the other end of the housing 33 to whose end a second, adjustable mirror 38 is attached. The mirror can be soldered on or glued. The tube is corrugated so that the mirror 38 can be adjusted. The two mirrors 36 and 38 form the laser resonator that is tuned by adjusting the mirror 38 to the resonant frequency of the laser light emerging from the laser crystal 35. The mirror 36 comprises a coating at its side facing toward the optics 34 that reflects the light having the wavelength λl of the laser light and that is transmissive for the wavelength of the pump light λp. The other side of the mirror 36 is coated such that both the pump light as well as the laser light are allowed to pass. The mirror 38 is designed such that it allows a partial reflection of the laser light that emerges from it.

FIGS. 2a and 2b show possible embodiments of the optical fibers that can be employed as light waveguides 2. FIG. 2a shows a fiber 4 having a round core 41, a cladding 42 and a protective sheath 43, and FIG. 2b shows a fiber 5 having a rectangular core 51, a cladding 52 and a protective sheath 53. The advantage of the rectangular cross-section is comprised therein that the cross-section can be optimally adapted to the individual emitters. The rectangular core can preferably have 300 through 330 μm×100 through 170 μm edge length. Given a round core, the diameter can likewise lie in the range of 100 through 330 μm. With an arrangement as shown in FIGS. 1, 2a and 2b, a diode power of approximately 20 W can be coupled into the laser crystal 35.

Figure 3:
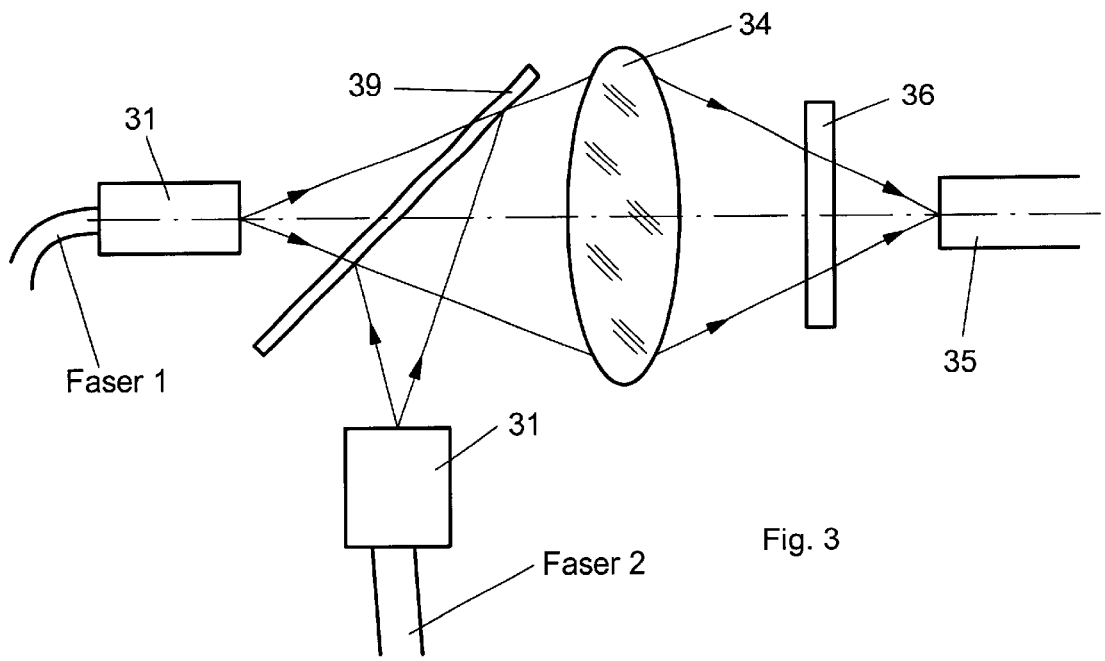
FIG. 3 is an arrangement for increasing the pump power, whereby two pump light sources having different wavelengths are merged.

FIG. 3 shows a further embodiment of the invention, whereby two pump light sources over two different wavelengths are merged for increasing the pump power. Of course, it is also within the scope of the invention that more than two pump light sources are merged in this way for further increasing the pump power. In a modification of FIG. 1 shown in FIG. 3, a second pump light source should likewise be supplied via a plug connection 31 in the region between the plug connection 31 and the optics 34. The light of the one pump light source emerges from the fiber 1 and may be assumed to have the pump wavelength $\lambda p1$, and the pump light that emerges from the fiber 2 may be assumed to have the pump wavelength $\lambda p2$. The beams of the two light sources are merged via the optics 34 via a semi-reflecting mirror 39 that is transmissive for the light of the pump wavelength $\lambda p1$ and that reflects the light of the pump wavelength $\lambda p2$, said beams, after having been merged, being conducted via the coupling optics 34 and the mirror 36 onto the laser crystal 35.

Figure 4:
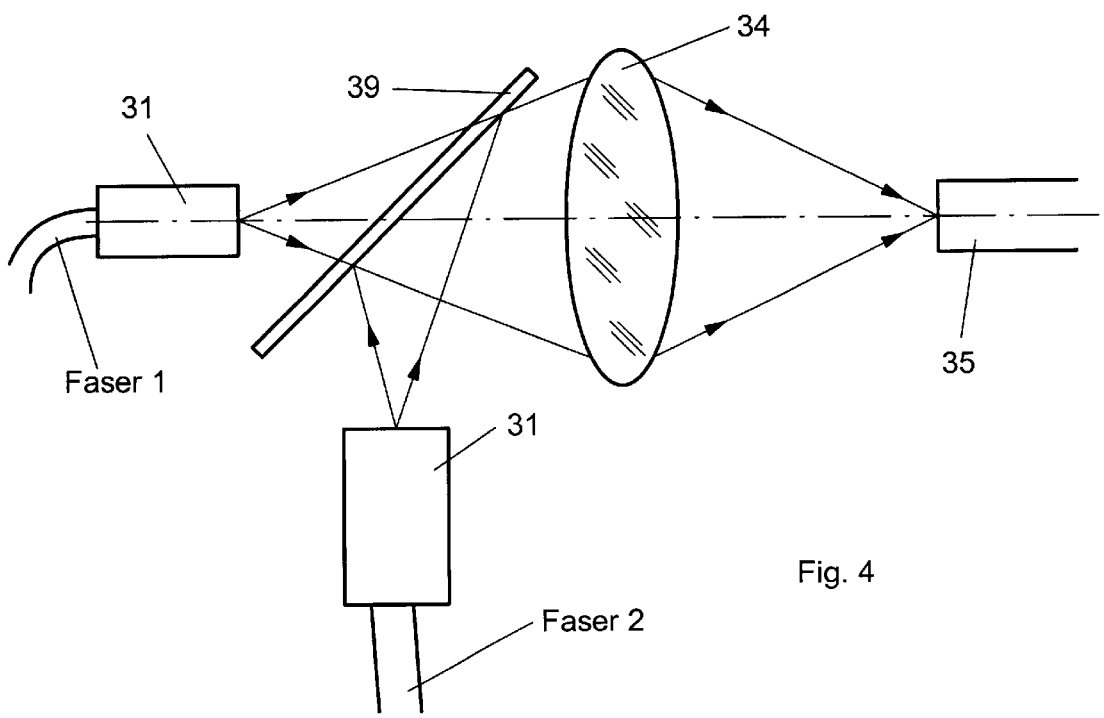
FIG. 4 is a further arrangement for increasing the pump power, whereby two pump light sources are supplied into a single fiber.

Another embodiment for increasing the pump power is shown in FIG. 4. Here, two pump light sources are to be coupled into a single fiber. For this purpose, an arrangement for merging the two pump light sources as shown in FIG. 4 has been selected, but with the difference that the light emerging from the coupling optics is not directly onto the laser crystal 35 but is coupled into an individual light waveguide that is designed as an optical fiber and is then forwarded to the laser resonator.

Figure 5:
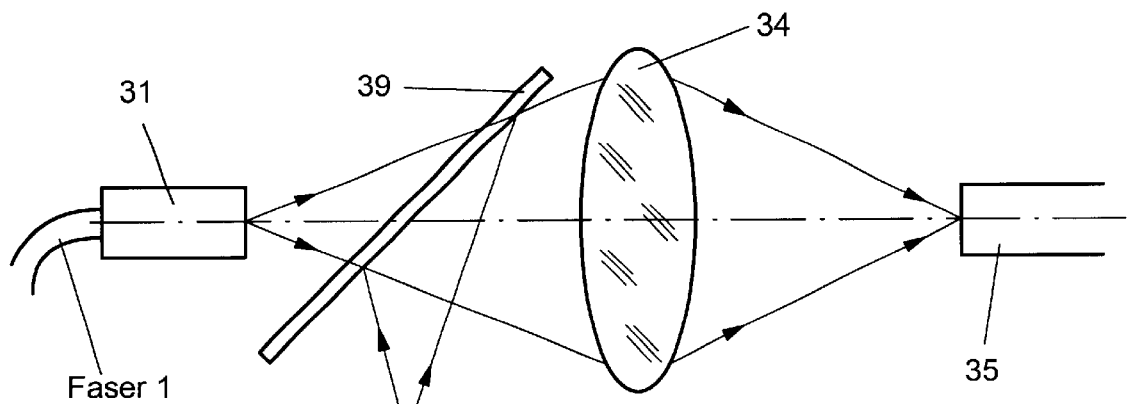
FIG. 5 is another arrangement for increasing the pump power, whereby two pump light sources having different polarization are merged.

FIG. 5 shows another arrangement for increasing the pump power, whereby two pump light sources are merged via polarization-preserving optical fibers and an arrangement comparable to FIG. 3. Let the light emerging from the fiber 1 be vertically polarized and let the light emerging from the fiber 2 be horizontally polarized. The mirror 39' should be transmissive for the vertical polarization and should be reflective for the horizontal polarization. Via the coupling optics 34, the light of the two light sources is then either conducted onto the laser crystal 35 via the mirror 36, as in FIG. 3, or, as shown in FIG. 4, is conducted in an individual waveguide.

Figure 6A:
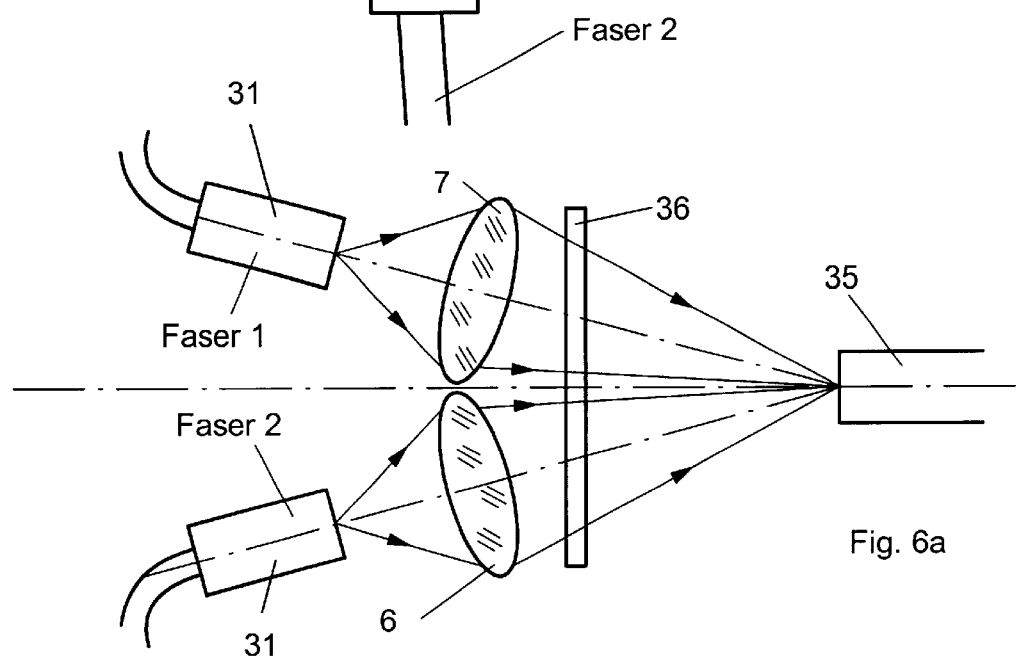
FIGS. 6a and 6b are further arrangements for increasing the pump power, wherein a circular arrangement of a plurality of pump light sources is employed.
Figure 6B:
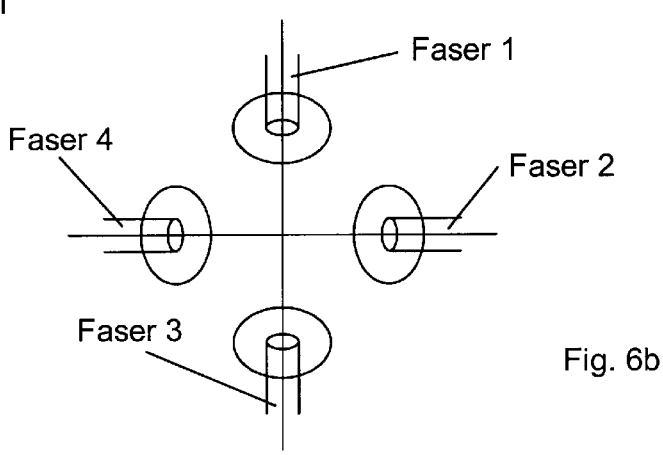

Further arrangements for increasing the pump power are shown in FIGS. 6a and 6b, whereby a circular arrangement of a plurality of pump light sources has been selected. Here, the light of the pump light sources is directed conducted onto the laser crystal 35 by the first laser mirror 36 at an angle relative to the axis of the laser resonator. FIG. 6a shows two fibers, each of which cast their light onto the laser crystal 35 via a pump optics 6 and 7 at an angle that lies perpendicular to the axis of the laser resonator 3. The angle must be selected such that there is still adequate space for the pump optics 6 and 7. In plan view, FIG. 6b shows an arrangement as in FIG. 6a, whereby four pump light sources are employed, these being rotationally-symmetrically arranged around the axis of the laser resonator.

Given these various arrangements described above, it likewise lies within the scope of the invention when the aforementioned stepped mirror arrangements for direct feed of the pump light are employed instead of the pump waveguides. These stepped mirrors are then arranged at the locations at which the light exits of the pump waveguides are located.

Figure 7:
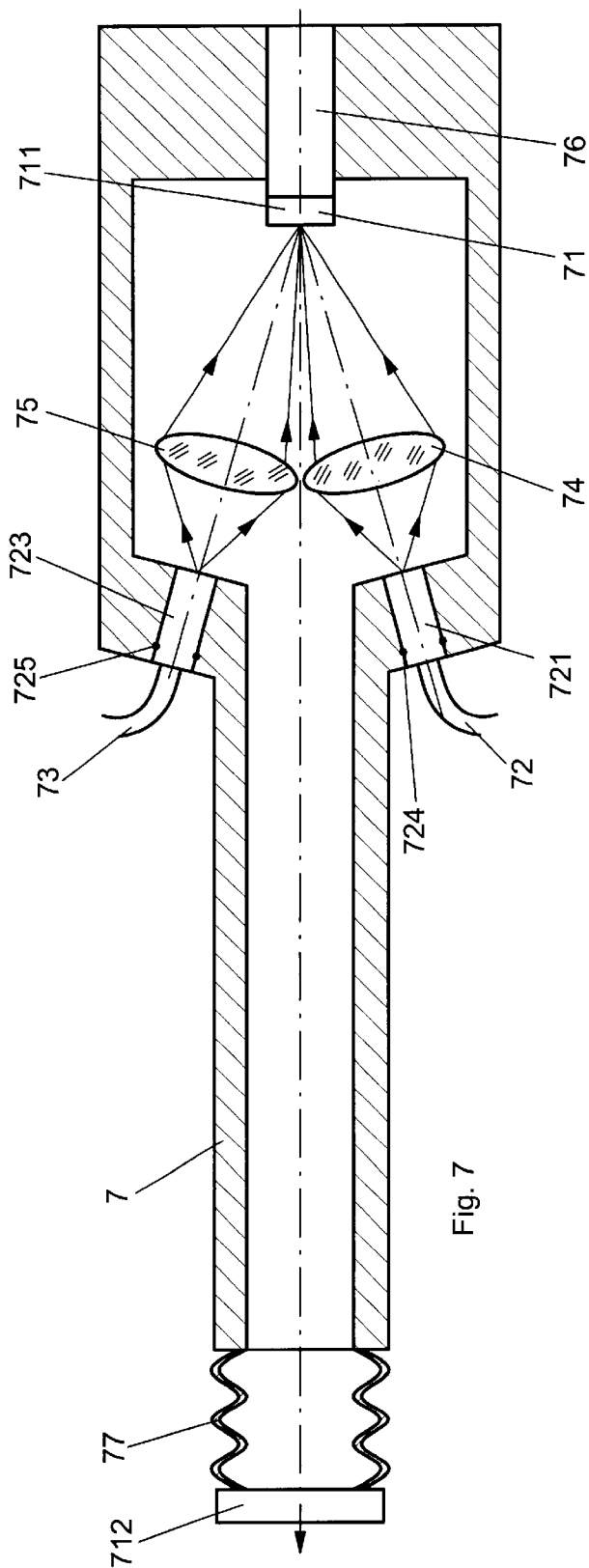
FIG. 7 is a sectional view through a further embodiment of a laser resonator, whereby two pump light sources couple the pump light directly into the resonator space.

FIG. 7 shows another embodiment of a laser resonator having a tubular housing 7, whereby the resonator space is hermetically sealed. A mirrored laser crystal 71 that is fashioned as wafer disk is excited with two pump light sources 72 and 73 whose plug connections 721 and 723 are sealed with the housing 7 by means of seal rings 724 and 725. The pump light is steered onto the laser crystal 71 via the two optics 74 and 75. The coating of the laser crystal 71, i.e. the first laser mirror 711 is of such a nature that it is reflective for the wavelength of the pump light $\lambda p$ and is transmissive for the wavelength of the laser light $\lambda L$. A cooling member 76 for eliminating the dissipated power is provided in axial direction following the laser crystal. The second laser mirror 712 is located at the other end of the resonator space and is adjustable via a corrugated metal bellows 77.

Figure 8:
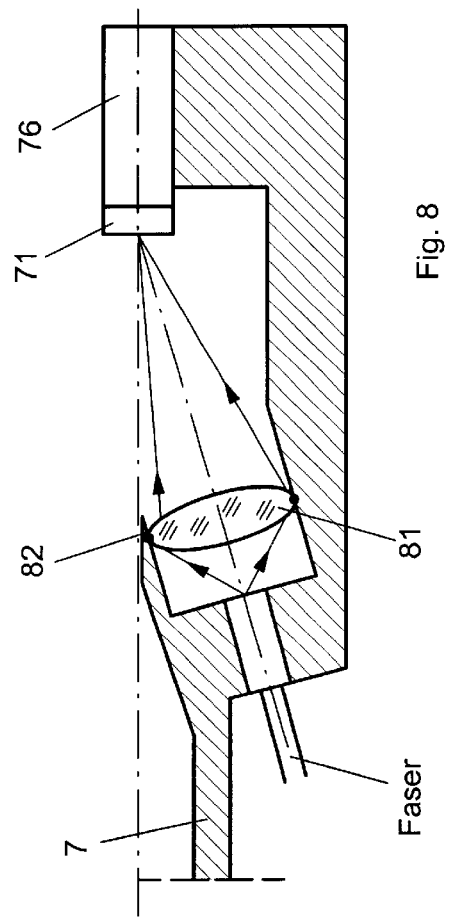
FIG. 8 is an embodiment of a seal of the pump light sources, whereby a lens assumes the sealing relative to the laser resonator.

FIG. 8 shows an arrangement 8 for sealing aa [sic] pump light source, whereby the seal is undertaken with a lens 81 and a ring seal 82. The two pump light sources of FIG. 7, for example could be sealed in this way.

FIG. 9 shows another embodiment of a laser resonator with tubular housing 7, whereby a disk-shaped, mirrored laser crystal 91 is likewise employed. The nature of the mirror face 911 through which the pump light enters is selected such that it is transmissive for the wavelength of the pump light $\lambda p$ and is reflective for the wavelength of the laser light $\lambda L$. The mirror face 912 at the inside of the resonator is of such a nature that it is reflective for the wavelength of the pump $\lambda p$ and is transmissive for the wavelength of the laser light $\lambda L$. The tubular housing 9—when the laser is cooled with air—can be provided with cooling ribs 92. Optionally, the Brewster plate 92 can be provided in the beam path of the laser. The housing 9 should be manufactured of highly thermally conductive material, for example copper. The interior of the resonator can be advantageously filled with protective atmosphere.

FIG. 10 shows a portion from another embodiment of a laser resonator with tubular housing 7, whereby a rod-shaped, mirrored laser crystal 101 is employed. The nature of the mirror face 102 through which the pump light enters is selected such that it is transmissive for the wavelength of the pump light $\lambda p$ and is reflective for the wavelength of the laser light $\lambda L$. The mirror face 103 at the inside of the resonator is anti-bloomed for the wavelength of the laser light $\lambda L$.

Although various minor changes and modifications might be proposed by those skilled in the art, it will be understood that my wish is to include within the claims of the patent warranted hereon all such changes and modifications as reasonably come within my contribution to the art.

I claim:

1. A solid-state laser, comprising:

at least two pump light sources generating polarized laser light of different polarities, said pump light sources including a plurality of laser diodes, a multi-mirror arrangement comprising a stepped mirror arrangement arranged behind said laser diodes and generating a high luminous density of the laser light by superimposing the laser light of the individual laser diodes, and a first lens arrangement following said multi-mirror arrangement;

single waveguides associated with said pump light sources into which the laser light of high luminous density leaving said pump light sources is coupled by said first lens arrangement;

a polarization-dependent and semi-translucent mirror following said light sources for further increasing the luminous density by combining the laser light transported by said single waveguides;

a second lens arrangement arranged behind said polarization-dependent and semi-translucent mirror; and an optical laser resonator having a laser crystal following said second lens arrangement, the laser light combined by said polarization-dependent and semi-translucent mirror being coupled into at least one of said laser crystal of the laser resonator and a further single waveguide by said second lens arrangement.

2. The solid state laser according to claim 1 wherein the laser light transported through the waveguide allocated to the pump light sources is merged in a wavelength-dependent optical superposition element for a further increase of the luminous density;

the merged laser light is coupled into a further individual light waveguide; and the laser light transported through the further light waveguide is coupled into the laser crystal with an optics.

3. The solid-state laser according to claim 1 wherein the light waveguides allocated to the pump light sources are aligned at an angle relative to one another such that the laser light transported through the waveguides is merged for the purpose of a further increase of the luminous density; and the merged laser light is coupled into the laser crystal.

4. The solid-state laser according to claim 1 wherein the laser resonator is hermetically sealed.

5. The solid-state laser according to claim 1 wherein the laser resonator is evacuated.

6. The solid-state laser according to claim 1 wherein the laser resonator is filled with a protective atmosphere.

7. The solid-state laser according to claim 1 wherein said single waveguides have a round cross-section.

8. The solid-state laser according to claim 1 wherein said single waveguides have an elliptical cross-section.

9. The solids-state laser according to claim 1 wherein said single waveguides have a quadratic cross-section.

10. The solid-state laser according to claim 1 wherein said single waveguides have a rectangular cross-section.

11. The solid-state laser according to claim 1 wherein said single waveguides comprise releasable plug connections at at least one end.

12. The solid-state laser according to claim 1 wherein the laser resonator comprises laser mirrors; and at least one of the laser mirrors is arranged directly on the laser crystal.

13. The solid-state laser according to claim 1 wherein the multi-mirror arrangement comprises a stepped mirror arrangement.

14. A solid-state laser, comprising:

at least two pump light sources generating laser light of different wavelengths, said pump light sources including a plurality of laser diodes, a multi-mirror arrangement comprising a stepped mirror arrangement arranged behind said laser diodes generating a high luminous density of the laser light by superimposing the laser light of the individual laser diodes, and a first lens arrangement following said multi-mirror arrangement;

single waveguides associated with said pump light sources into which the laser light of high luminous density leaving said pump light sources is coupled by said first lens arrangement;

a wavelength-dependent and semi-translucent mirror following said light sources for further increasing the luminous density by combining the laser light transported by said single waveguides;

a second lens arrangement arranged behind said wavelength-dependent and semi-translucent mirror; and an optical laser resonator having a laser crystal following said second lens arrangement, the laser light combined by said wavelength-dependent and semi-translucent mirror being coupled into at least one of said laser crystal of the laser resonator and into a further single waveguide by said second lens arrangement.

15. The solid-state laser according to claim 14 wherein the laser light transported through the waveguide allocated to the pump light sources is merged in a wavelength-dependent optical superposition element for a further increase of the luminous density; and the merged laser light is coupled into the laser crystal with an optics.

16. The solid-state laser according to claim 14 wherein the laser light transported through the waveguide allocated to the pump light sources is merged in a wavelength-dependent optical superposition element for a further increase of the luminous density;

the merged laser light is coupled into a further individual light waveguide;

the laser light transported through the waveguide allocated to the pump light sources is merged in a wavelength-dependent optical superposition element for a further increase of the luminous density;

the merged laser light is coupled into a further individual light waveguide; and the laser light transported through the further light waveguide is coupled into the laser crystal with an optics.

17. The solid-state laser according to claim 14 wherein the light waveguides allocated to the pump light sources are aligned at an angle relative to one another such that the laser light transported through the waveguides is merged for the purpose of a further increase of the luminous density; and the merged laser light is coupled into the laser crystal.

18. The solid-state laser according to claim 14 wherein the laser resonator is hermetically sealed.

19. The solid-state laser according to claim 14 wherein the laser resonator is evacuated.

20. The solid-state laser according to claim 14 wherein the laser resonator is filled with a protective atmosphere.

21. The solid-state laser according to claim 14 wherein said single waveguides have a round cross-section.

22. The solid-state laser according to claim 14 wherein said single waveguides have an elliptical cross-section.

23. The solid-state laser according to claim 14 wherein said single waveguides have a quadratic cross-section.

24. The solid-state laser according to claim 14 wherein said single waveguides have a rectangular cross-section.

25. The solid-state laser according to claim 14 wherein said single waveguides comprise releasable plug connections at at least one end.

26. The solid-state laser according to claim 14 wherein the laser resonator comprises laser mirrors; and at least one of the laser mirrors is arranged directly on the laser crystal.

27. The solid-state laser according to claim 14 wherein the multi-mirror arrangement comprises a stepped mirror arrangement.

28. A solid-state laser, comprising:

at least one pump light source with a plurality of laser diodes;

an optical laser resonator with a laser crystal whereby laser light generated in the laser diodes is coupled into the laser crystal;

for generating a high luminous density of the laser light coupled into the laser crystal, the laser diodes of each pump light source are followed by a multi-mirror arrangement with which the laser light of the individual laser diodes is superimposed;

a single waveguide into which the superimposed laser light with high luminous density is coupled and transported to the laser crystal is arranged behind the multi-mirror arrangement of each pump light source; and the light waveguides comprising releasable plug connections at at least one end.

29. A method for operating a solid-state laser, comprising the steps of:

generating polarized laser light of different polarities with at least two pump light sources, the pump light sources including a plurality of laser diodes, generating a high luminous density of the laser light by superimposing the laser light of the individual laser diodes with a multi-mirror arrangement, and providing a first lens arrangement following the multi-mirror arrangement;

coupling with said first lens arrangement the laser light of high luminous density leaving said pump light sources into single waveguides associated with said pump light sources;

increasing the luminous density by combining the laser light transported by said single waveguides by use of a polarization-dependent and semi-translucent mirror following the light sources;

arranging a second lens arrangement behind the polarization-dependent and semi-translucent mirror; and providing an optical laser resonator having a laser crystal following said second lens arrangement, and coupling the laser light combined by said polarization-dependent and semi-translucent mirror into at least one of said laser crystal of the laser resonator and a further single waveguide by said second lens arrangement.

30. A method for operating a solid-state laser, comprising:

generating laser light of different wavelengths with at least two pump light sources, the pump light sources including a plurality of laser diodes, generating a high luminous density of the laser light by superimposing the laser light of the individual laser diodes by use of a multi-mirror arrangement arranged behind said laser diodes, and providing a first lens arrangement following the multi-mirror arrangement;

coupling by said first lens arrangement the laser light of high luminous density leaving said pump light sources into single waveguides associated with said pump light sources;

further increasing the luminous density by combining the laser light transported by said single waveguides by use of a wavelength-dependent and semi-translucent mirror;

arranging a second lens arrangement behind said wavelength-dependent and semi-translucent mirror; and providing an optical laser resonator having a laser crystal following the second lens arrangement, and coupling by said second lens arrangement the laser light combined by said wavelength-dependent and semi-translucent mirror into at least one of said laser crystal of the laser resonator and a further single waveguide.

* * * * *